United States Patent [19]
Schauhoff et al.

[11] Patent Number: 5,393,813
[45] Date of Patent: Feb. 28, 1995

[54] POLYOXYMETHYLENE HAVING IMPROVED ACID STABILITY

[75] Inventors: Stephanie Schauhoff, Frankfurt; Edwin Nun, Brachtal; Detlef Arnoldi, Weisenheim am Berg, all of Germany

[73] Assignee: Degussa Aktiengesellschaft, Frankfurt, Germany

[21] Appl. No.: 140,357

[22] Filed: Oct. 22, 1993

[30] Foreign Application Priority Data

Oct. 24, 1992 [DE] Germany .......................... 4236465.5
Oct. 24, 1992 [DE] Germany .......................... 9214402.0

[51] Int. Cl.$^6$ .......................... C08J 5/10; C08K 5/34; C08L 59/02
[52] U.S. Cl. .......................... 524/101; 524/91; 524/327; 524/386; 524/495; 524/496
[58] Field of Search ............ 524/101, 327, 386, 91, 524/495, 496

[56] References Cited

U.S. PATENT DOCUMENTS

| | | | |
|---|---|---|---|
| 4,298,518 | 11/1981 | Ohmura et al. | 260/32.6 NA |
| 4,446,263 | 5/1984 | Bryant | 524/100 |
| 5,294,661 | 3/1994 | Takaya et al. | 524/504 |

*Primary Examiner*—Paul R. Michl
*Assistant Examiner*—U. K. Rajguru
*Attorney, Agent, or Firm*—Cushman, Darby & Cushman

[57] ABSTRACT

By adding melamine cyanurate, polyoxymethylene is stabilized against acid attack, wherein in particular as little as under 3 parts of MCA per 100 parts of POM are effective. The weight loss of a stabilized POM under the action of acid may be less than 3% of that of an unstabilized POM. The product is useful in products which are exposed to acidic agents such as irrigation systems, dishwashers, sanitary installations.

6 Claims, No Drawings

POLYOXYMETHYLENE HAVING IMPROVED ACID STABILITY

The present invention relates to polyoxymethylene (POM) with improved acid resistance and finer spherulite structure, to articles molded from it, to a process for the production of polyoxymethylene with improved acid resistance and to the use of polyoxymethylene in contact with acidic media and in molded articles with a finer spherulite structure.

BACKGROUND OF THE INVENTION

Polyoxymethylene (polyacetal) is an extraordinary material from which the most varied articles may be produced, in particular by injection molding. An advantageous feature is, in particular, its chemical resistance against many organic solvents and also bases. Since the introduction of polyacetals onto the market, attempts have been made to reduce the acid lability arising from their chemical structure. Unless protective measures are taken, the repeating acetal structure in the polymer chain has unstable semi-acetal terminal groups from which polymer degradation proceeds. In order to stabilize the polymer, its terminal groups may be protected by esterification or etherification, as described in H. Cherdron, L. Höhr, W. Kern, Makromol. Chem., 52, 48 et seq. (1962). Another method is to incorporate comonomers which form a stable terminal group on degradation of the polymer chain. This makes polyoxymethylene (POM) fit for everyday use, but the acid lability remains, since (c.f. V. V. Pchelintsev, A. Yu. Sokolov, G. E. Zaikov, Polym. Degradation and Stability, 21(4), 285 (1988)) acid catalyzed hydrolytic decomposition of POM may take place at any location on the polymer such that stabilized terminal groups or comonomer units do not provide sufficient protection. It is known from German patent DE 11 93 240 that high proportions of a urethane scavenge the formaldehyde arising from acidolysis An example of this is a molded article with 40% POM. In this way, the odor problems or hazard to health caused by liberated formaldehyde are reduced, but the POM is still degraded. Moreover, a product with 40% POM / 60% TPU no longer has a POM matrix so that the advantageous properties of ROM (e.g. stiffness) are lost. German patent DE 12 35 585 describes the acylation of POM with carbodiimide. This considerably reduces acidolytic degradation of the polymers by free acetic acid. The carbodiimide is, in particular, intended to provide stabilization for the transient acid conditions during esterification. Investigations have, however, shown that the products produced in this manner are also unsuitable for use under acidic conditions.

It is furthermore known, for example from German patent DE 25 40 207, to add basic substances, such as salts for example, to the POM to provide protection from the acidic conditions arising during production and processing. The basic substances act to neutralize acidic components in the polymer and so only those salts whose acidic portion does not itself attack the POM are suitable. Thus, for example, a small quantity of sodium carbonate may be added to a polyoxymethylene. The products so obtained are also unsuitable for use under acidic conditions.

SUMMARY OF THE INVENTION

The object of the present invention is to provide a polyoxymethylene or a production process for a polyoxymethylene which has acid stability and from which fine or filigree articles may be injection molded. The polyoxymethylene should as far as possible retain its original physical properties, such as for example stiffness, toughness, color.

This object is achieved by means of the polyoxymethylene with the following composition:

Polyoxymethylene with improved acid stability containing

A at least one polyoxymethylene,

B 0.05–<3 parts, related to 100 parts of A, of melamine cyanurate, preferably up to 2.5% and most preferred up to 2%, together with C up to 5 parts, related to 100 parts of A, of an alkali metal salt of a polybasic carboxylic acid and D up to 5 parts, related to 100 parts of A, of a polyalkylene glycol, E up to 100 parts, related to 100 parts of A, of a thermoplastic polyurethane, F customary additives.

It has been established according to the invention that even small quantities of melamine cyanurate (MCA) are suitable for reducing the acid lability of POM. Melamine cyanurate may also be combined with further substances suitable for reducing acid sensitivity together with further customary components miscible with POM. It has also been found that some substances which have previously been used in POM as acid scavengers actually even have a negative effect on the acid resistance of the finished product and may lead to considerable discoloration. Thus, for example, carbodiimides and also sodium carbonate are unsuitable for the purposes of the present invention.

Suitable added components to reduce acid sensitivity may, for example, be salts of polybasic carboxylic acids, thermoplastic polyurethanes (TPU) and polyalkoxy glycols.

According to the invention, stabilization of the POM is determined as follows:

Crude polyoxymethylene is extruded on a ZSK 28 (twin screw extruder) under customary conditions with additives. The strands leaving the extruder are cooled by being passed through cold water and are then pelletized. The dried pellets are then compression molded at 190° C. into sheets of dimensions 15.8 cm × 15.8 cm × 0.2 cm, from which test pieces of dimensions 7.8 cm × 1.0 cm × 0.2 cm are sawed. A hole is drilled through the top of the test pieces, which are deburred, exactly remeasured and weighed.

Test:

Five test pieces of each sheet are immersed to a depth of 5 cm in 2 wt.% phosphoric acid, lifted out slowly and any acid remaining on the sheet allowed to drip off. The last acid droplets remaining on the bottom of the test pieces are wiped off with cellulose wadding. The test pieces are carefully threaded onto a wire and suspended without being in contact with each other for 24 hours at relative atmospheric humidity of between 20 and 30%. Atmospheric humidity is adjusted by means of silica gel which is changed daily, so achieving atmospheric humidity of approx. 20%, which rises to a maximum of 30% within 24 hours. The traces of acid remaining on the test pieces cause corrosion (cratering on the test pieces), the extent of which is determined by weighing.

The test pieces are then re-exposed to phosphoric acid. This procedure is repeated until the test piece (at least those made from unstabilized POM) exhibit clear damage (loss 5 mg/cm$^2$). Excessive damage should be avoided since this alters the geometry of the test piece in such a way that it complicates the determination of the loss in mg/cm$^2$. The period of 24 hours was selected because, under the stated conditions (room temperature), no further damage occurs after this time. This means that the test piece may optionally remain under the stated conditions for a longer period before being reimmersed in the phosphoric acid. This also means that the test pieces do not have to be treated for example at weekends. In the present case, the test pieces were not immersed in the phosphoric acid on the 5th and 6th days.

The average loss of mass in % (mg/cm$^2$ of immersed surface) is determined in relation to the average loss of mass of the standard polyoxymethylene.

The polyoxymethylene blends with improved acid resistance obtained according to the invention are particularly suitable for applications in which the products are at least temporarily exposed to acidic agents, in particular for irrigation system components or complete systems for applying fertilizers, dispensing containers of any kind, for example in dishwashers (decalcifying agents are acids), products for storing or distributing chlorinated or fluorinated water, components for sanitary installations.

The polyoxymethylenes with improved acid stability according to the invention contain A at least one polyoxymethylene, B 0.05–<3 parts of melamine cyanurate and optionally C up to 5 parts, in particular 0.1–2 parts, related to 100 parts of A, of at least one alkali metal salt of a polybasic carboxylic acid, for example from the group oxalic acid, maleic acid, fumaric acid, citric acid and D up to 5 parts, in particular 0.1–2 parts, related to 100 parts of A, of a polyalkylene glycol, for example a polyethylene glycol, in particular with a molecular weight of $\leq 5000$ and/or a polypropylene glycol and/or a polybutylene glycol, E up to 100 parts, in particular up to 10 parts, related to 100 parts of A, of a thermoplastic polyurethane preferably with a Shore A hardness of 70 to 96.

Advantageously, on acid treatment these polyoxymethylene blends have a loss of mass per unit area of a maximum of 75%, advantageously of a maximum of 50%, in particular of a maximum of 33% and particularly preferably of a maximum of 15%, in relation to component A, wherein acid treatment comprises the following stages:

brief immersion of a test piece in 2 wt.% phosphoric acid, storage of test piece for some 24 hours at 20–30% relative atmospheric humidity, optional repetition of these stages until an equivalently treated test piece prepared from component A has undergone a loss of at least 5 mg/cm$^2$.

Melamine cyanurate is already known for use in quantities of 3 parts per 100 parts of POM as a flame retardant or to influence sliding friction behavior (T. Hirae, H. Iwai, M. Sato, M. Watanabe, Y. Tsuya, ASLE Trans., 25 (4), 489–501 (1982); JP-A 79-85 242).

The favorable flame retardant action of melamine cyanurate used in amounts of $\geq 3$ parts per 100 parts of polymer are also known for other polymers such as polyamides or polyurethanes (DE 41 27 112 C1).

Furthermore, melamine itself has long been known as a heat stabilizer in POM (Gächter/Müller, Kunststoffadditive [plastics additives], Verlag Hauser, 1979, p. 62). Other triazine derivatives (EP 0 270 729, US 4,578,422) and melamine-formaldehyde condensates (DE 25 40 207, EP 0 363 752) are also described as heat stabilizers for POM. However, neither melamine nor its other derivatives exhibit appropriate acid stabilizing action.

It has been established according to the invention that, apart from its stabilizing action against acids, MCA also has further advantageous properties. Thus, melamine cyanurate acts in POM as a heat stabilizer and nucleating agent in a similar manner to the melamine-formaldehyde condensates. Table 3 shows the weight losses of pellets under nitrogen and air, measured after 2 hours at 220° C. on samples containing either MFK or melamine cyanurate. Isothermal crystallization times measured at 149° C. or 151° C. are also shown. In comparison with MFK, melamine cyanurate produces a finer spherulite structure, as shown in Table 4, wherein the crystallization times are hardly any different compared with those for MFK. Due to the finer spherulite structure, POM containing MCA may be processed into finer filigree parts, wherein these parts are generally produced by injection molding.

The invention therefore also relates to injection molded articles which contain 0.05 to 15 parts of MCA and optionally further additives per 100 parts of POM. The injection molded parts advantageously contain less than 10 parts, and in particular less than 5 parts, of MCA. Particularly preferred are those injection molded articles weighing up to 5 g, advantageously up to 3 g and in particular up to 1 g, since high demands are usually placed on such parts in terms of precision.

A particularly high degree of acid resistance is achieved with polyoxymethylenes of the above-stated type which, in addition to component B, advantageously contain, related to 100 parts of component A, up to 100 parts, advantageously up to 50 parts, in particular up to 25 parts and particularly preferably up to 10 parts of a thermoplastic polyurethane.

The polyoxymethylenes according to the invention customarily also contain additives such as, for example, antioxidants, carbon black, colorants, UV absorbers, heat stabilizers, flame retardants etc. These additives may be incorporated into the blends or also into individual components thereof. Particularly for external applications, UV stabilizers and/or carbon black are convenient to prevent premature aging.

Suitable polyoxymethylenes for component A are homopolymers or copolymers, for example produced from formaldehyde or trioxane. They may have a linear structure, but may also be branched or crosslinked. They may be used individually or as blends. Homopolymers are, for example, polymers of formaldehyde or of trioxane, the semi-acetal hydroxyl terminal groups of which are chemically stabilized against degradation, for example by esterification or etherification. Copolymers are, in particular, obtained by copolymerization of trioxane with at least one compound copolymerizable with trioxane. Cyclic ethers are, for example, suitable for this purpose, in particular those with 3–5, preferably 3 ring members, cyclic acetals other than trioxane, in particular formals, for example with 5–11, preferably 5–8 ring members and linear polyacetals, in particular polyformals. The stated comonomers are preferably used in quantities of 0.01–20, in particular 0.1–10 and particularly advantageously 1–5 wt. %. Suitable cyclic ethers are especially epoxides, for example ethylene oxide, styrene oxide, propylene oxide or epichlorohydrin together with glycidyl ethers of mono- or polyhydric alcohols or phenols. Suitable cyclic acetals are especially cyclic formals of aliphatic or cycloaliphatic α, ω-diols with 2–8, preferably 2–4 carbon atoms, the carbon chain of which may be interrupted at 2 carbon atom intervals by an oxygen atom, for example 1,2- or 1,3-dioxolane, 1,3-dioxane, 1,3-dioxepane, etc.

Diformals, for example diglycerol diformal, are however also suitable, particularly for the production of trioxane terpolymers.

Suitable linear polyacetals are both homo- or copolymers of the above defined cyclic acetals and linear condensates of aliphatic or cycloaliphatic α, ω-diols with aliphatic aldehydes or thioaldehydes, preferably formaldehyde. In particular, homopolymers of cyclic formals of aliphatic α,ω-diols with 2–8 carbon atoms, for example poly- (1,3-dioxolane), poly- (1,3-dioxane) and poly- (1,3-dioxepane) .

The viscosity number of the polyoxymethylene used according to the invention (measured on a solution of the polymer in dimethylformamide containing 2 wt. % of diphenylamine at 135° C. at a concentration of 0.5 g/100 ml) should generally be at least 30 (ml/g). The crystalline melting points of the polyoxymethylenes are preferably in the range 140°–180° C., in particular 150°–170° C.; densities are customarily between 1.38–1.45 g/cm$^3$ (measured to DIN 53 479).

The preferably binary or ternary trioxane copolymers used according to the invention are produced in a known manner by polymerizing the monomers in the presence of cationically active catalysts at temperatures between 0 and 150° C., preferably above 70° C. (c.f. DE-AS 14 20 283). Polymerization may be performed by bulk, suspension or solution methods. In order to eliminate unstable portions, the copolymers may be subjected to controlled, partial thermal or hydrolytic degradation to the primary alcohol terminal groups (c.f. for example DE-AS 14 45 273 and 14 45 294).

Further preparative methods are described, for example, in DE-AS 10 37 705 and 11 37 215.

Furthermore, the molding compounds according to the invention may additionally customarily contain up to 3 wt. %, related to the weight of the polyoxymethylene, of other additives customary in polyoxymethylene molding compounds. These may be:

antioxidants, in particular phenolic compounds, for example those with 2–6 hydroxyphenyl residues in the molecule, such as are, for example, described in German patent DE 25 40 207.

UV absorbers and light stabilizers such as, for example, 2-(2'-hydroxyphenyl)-benzotriazoles, 2,4-bis-(2'-hydroxyphenyl)-6-alkyl-s-triazines and 4-hydroxybenzophenones.

heat stabilizers such as, for example, carboxylic acid amides, in particular oxalic, malonic, isophthalic, terephthalic acid diamide and trimesic acid triamide; polyamides, salts of long-chain carboxylic acids such as, for example, Ca-stearate, melamine, s-triazine derivatives or condensation products of melamine and formaldehyde.

The thermoplastic polyurethanes used according to the invention are per se known products, such as are, for example, described in German patent DE 11 93 240 or in published German Patent Application DE-OS 20 51 028. They are produced in a per se known manner by polyaddition of polyisocyanates, in particular diisocyanates, polyesters and/or polyethers or polyester amides or other suitable hydroxy or amino compounds, such as hydroxylated polybutadiene and optionally chain extenders such as low molecular weight polyols, in particular diols, polyamines, in particular diamines, or water.

In principle, all grades of polyurethane and the combinations thereof, such as for example polyester urethanes, polyetherester urethanes, polyether urethanes, aliphatic TPU and/or polyethercarbonate urethanes are suitable. However, polyester urethanes are preferably used. Such polyester urethanes which are preferred here are those with a Shore A hardness of 80–96, particularly preferably those with a Shore A hardness of 84–92. The concentration of polyurethane used is 0.1–3 parts by weight related to 100 parts of polyoxymethylene. Polyalkylene glycols are suitable as component D, polyethylene glycols and polypropylene glycols are preferably used, particularly preferably polyethylene glycols. The molecular weight of the polyalkylene glycols used is ≦5000, preferably 800–2000, particularly preferably 900–1500.

The invention also relates to a process for the production of a polyoxymethylene with improved acid resistance and/or finer spherulite structure in which A 100 parts of polyoxymethylene are blended with
B 0.05–15 parts of melamine cyanurate and optionally
C up to 5 parts of a salt of a polybasic carboxylic acid,
D up to 5 parts of a polyalkene glycol,
up to 100 parts of a thermoplastic polyurethane and
F customary additives and are optionally processed into molded articles by compression or injection molding.

The acid resistance of the products produced in this manner may be determined as described above.

The polyoxymethylene compositions according to the invention are preferably processed into molded articles.

The invention also relates to the use of 0.05–15 parts of melamine cyanurate (B) and optionally
up to 5 parts of a salt of a polybasic carboxylic acid (C),
up to 5 parts of a polyalkylene glycol (D), such as for example a polyethylene glycol, polypropylene glycol and/or polybutylene glycol,
up to 100 parts of a thermoplastic polyurethane (E) and
customary additives (F) per 100 parts of a polyoxymethylene (A) in order to improve acid resistance or in a molded article with improved acid resistance or in a molded article with a fine spherulite structure. The procedure for determining acid resistance described above may be used in this case as well.

The above-stated ranges for the added components also apply to the process and use. For the TPU, it is again those with Shore A hardness as stated above and the above-stated smaller quantities which are preferred.

DETAILED DESCRIPTION OF PREFERRED EMBODIMENTS

The invention is more closely illustrated in the following examples.

Description of materials used

POM 1: Copolymer prepared from trioxane and 1,3-dioxepane with approx. 2.55% comonomer content, already stabilized with 0.4% triethylene glycol bis-(3-tert.butyl-5-methyl4-hydroxyphenyl)-propionate as antioxidant. MFI: 8 to 10 g/10 min (190° C./2.16 kp)

MCA: Melamine cyanurate (MCA), technical grade

MFK: Finely divided, crosslinked melamine-formaldehyde condensate, as for example described in DE 25 40 207.

EXAMPLES

Comparative example a and examples 1-4

The components POM, MFK and MCA were mixed together in the weight ratios relative to POM stated in Table 1. The blend was melted and homogenized in a model ZDS-K 28 twin screw extruder and the homogenized mixture pelletized. Sheets of dimensions 15.8×15.8×0.2 cm were compression molded from the pellets at 190° C. Test pieces of dimensions 7.8×1.0×0.2 cm were sawed from these, deburred, exactly remeasured and weighed. There was no immersion on the 5th, 6th, 12th, 13th, 19th and 20th days.

TABLE 1

| Comparative test/Example | MCA (%) | MFK (%) | Corrosion rates Test 1 (8 d) (%) rel. to a |
| --- | --- | --- | --- |
| a | — | 0.15 | 100.0 |
| 1 | 0.15 | 0.15 | 71.0 |
| 2 | 0.2 | 0.15 | 62.0 |
| 3 | 0.3 | 0.15 | 49.0 |
| 4 | 0.5 | 0.15 | 37.0 |

Comparative sample a had a weight loss (mg/cm$^2$ of surface) of 4.5, 7.2 and 17.7 respectively on the 4th, 5th and 8th days.

Comparative example b and examples 5-9

The same procedure was used as in Examples 1-4.

TABLE 2

| Comparative test/Example | MCA (%) | MFK (%) | Corrosion rates Test 1 (11 d) (%) rel. to b |
| --- | --- | --- | --- |
| b | — | 0.15 | 100.0 |
| 5 | 1 | 0.15 | 21.0 |
| 6 | 2 | 0.15 | 9.1 |
| 7 | 3 | 0.15 | 6.7 |
| 8 | 5 | 0.15 | 3.2 |
| 9 | 10 | 0.15 | 2.9 | b/example 9 had a weight loss (mg/cm$^2$ of surface) of 6.8/0.5, 37.2/1.1, not determined/1.5, not determined/1.7 respectively on the 4th, 11th, 18th and 25th days.

Comparative examples c-h and examples 10-14

In order to determine weight loss under N$_2$ or air, approx. 1.2 g of pellets produced as described in Examples 1-4 were weighed out into a test tube (approx. 12 mm) and heated to 220° C. (melt) in an aluminum heating block while approx. 2.8 l/h of nitrogen or air were passed over for 2 hours. Weight loss is determined after cooling to room temperature.

In order to determine the isothermal crystallization time, approx. 5 mg of pellets were melted in a Differential Thermal Analyzer (Mettler TA 3000) at 190° C. for 5 minutes. The temperature was then reduced at 40° C./minute to 149 or 151° C. and the time until the maximum of the exothermal signal measured.

TABLE 3

Thermal stability and isothermal crystallization times of POM with various amounts of added stabilizers

| Comparative example/ Example | Stabilizer | Stabilizer concentration (%) | Wt. loss under, N$_2$ (%)* | Wt. loss under air (%)* | Isothermal crystallization time (s) | |
| --- | --- | --- | --- | --- | --- | --- |
| | | | | | 149° C. | 151° C. |
| c | — | 0 | 1.48 | 1.91 | 45 | 61.8 |
| d | MFK** | 0.1 | 0.45 | 1.79 | 40.2 | 54 |
| e | MFK | 0.15 | 0.38 | 1.81 | 37.8 | 51 |
| f | MFK | 0.2 | 0.33 | 1.65 | 36 | 48 |
| g | MFK | 0.3 | 0.31 | 1.59 | 34.2 | 43.8 |
| h | MFK | 0.5 | 0.33 | 1.71 | 31.2 | 40.8 |
| 10 | Melamine cyanurate | 0.1 | 0.29 | 1.4 | 40.8 | 55.8 |
| 11 | Melamine cyanurate | 0.15 | 0.3 | 1.31 | 40.2 | 58.8 |
| 12 | Melamine cyanurate | 0.2 | 0.36 | 1.26 | 40.8 | 54 |
| 13 | Melamine cyanurate | 0.3 | 0.35 | 1.22 | 36 | 49.8 |
| 14 | Melamine cyanurate | 0.5 | 0.35 | 1.23 | 36 | 52.8 |

*2 hours at 220° C.
**melamine-formaldehyde condensate

Comparative examples i and k and example 15

Thin sections of approx. 1 μm in thickness were prepared from pellets produced as described in Examples 1-4 and spherulite size was determined from light microscope micrographs under polarized light (enlargement 160×).

TABLE 4

Spherulite sizes in POM as a function of nucleating agent.

| Comparative test/Example | Nucleating agent | Stabilizer concentration (%) | Spherulite size |
| --- | --- | --- | --- |
| i | — | 0 | 100-150 m |
| k | MFK | 0.15 | 40-60 m |
| 15 | Melamine | 0.15 | approx. 30 m |

TABLE 4-continued

Spherulite sizes in POM
as a function of nucleating agent.

| Comparative test/Example | Nucleating agent | Stabilizer concentration (%) | Spherulite size |
|---|---|---|---|
| | cyanurate | | |

Comparative examples 1 and m and examples 16 and 17

Injection moldings (standard small rods 5 cm×0.6 cm×0.4 cm) were produced (Arburg Allrounder 320-210-850) from pellets produced as described in examples 1–4 at a melt temperature of 190°–200° C. and a mold surface temperature of 80°–100° C.

Thin sections of approx. 1 m in thickness were made from these standard small rods and spherulite size was determined from light microscope micrographs under polarized light (enlargement 160× or 250×).

TABLE 5

| Spherulite sizes in POM as a function of nucleating agent | | | |
|---|---|---|---|
| Comparative test/Example | Nucleating agent | Stabilizer concentration (%) | Spherulite size |
| 1 | MFK | 0.15 | 35 μm |
| m | MFK | 0.5 | 20 μm |
| 16 | MCA | 0.15 | 23 μm |
| 17 | MCA | 0.5 | 15 μm |

What is claimed is:

1. A polyoxymethylene composition which has improved acid stability containing

A at least one polyoxymethylene,

B 0.05–<3 parts, related to 100 parts of A, of melamine cyanurate together with

C up to 5 parts, related to 100 parts of A, of an alkali metal salt of a polybasic carboxylic acid and D up to 5 parts, related to 100 parts of A, of a polyalkylene glycol, E up to 100 parts, related to 100 parts of A, of a thermoplastic polyurethane, F customary additives.

2. A polyoxymethylene according to claim 1 in which the loss of mass per unit area on acid treatment is a maximum of 75%, in relation to component A, when tested by an acid treatment which comprises the following stages:

brief immersion of a test piece in 2 wt. % phosphoric acid, storage of test piece for some 24 hours at 20–30% relative atmospheric humidity, repetition of these stages, if necessary, until an equivalently treated test piece prepared from component A has undergone a loss of at least 5 mg/cm$^2$.

3. A polyoxymethylene according to claim 1 or 2, which contains at least one customary additive selected from the group consisting of antioxidants, colorants, UV absorbers, heat stabilizers and flame retardants.

4. A polyoxymethylene as set forth in claim 3 in which the colorant is carbon black.

5. A shaped article of a polyoxymethylene composition according to claim 1.

6. An injection molded article containing

A a polyoxymethylene,

B 0.05–15 parts, related to 100 parts of component A, of melamine cyanurate.

* * * * *